United States Patent [19]

Zaragoza

[11] 4,144,353

[45] Mar. 13, 1979

[54] ARTIFICIAL FISH EGGS AND METHOD OF MAKING SAME

[76] Inventor: Joe C. Zaragoza, 729 Brentwood Dr., Bakersfield, Calif. 93306

[21] Appl. No.: 749,395

[22] Filed: Dec. 10, 1976

[51] Int. Cl.$^2$ .............................................. A01K 85/00
[52] U.S. Cl. ....................................... 426/1; 426/104; 426/250; 426/615; 426/520
[58] Field of Search ................... 426/1, 250, 251, 252, 426/331, 615, 438, 520

[56] References Cited

U.S. PATENT DOCUMENTS

| | | | |
|---|---|---|---|
| 1,045,716 | 11/1912 | Mack et al. ............................... | 426/1 |
| 1,291,614 | 1/1919 | Noxon ............................... | 426/104 X |
| 1,886,233 | 11/1932 | Sanders ............................ | 426/615 X |
| 2,062,903 | 12/1936 | Handy ................................. | 426/252 |
| 2,536,176 | 1/1951 | Harriss ............................. | 426/615 X |
| 2,692,831 | 10/1954 | Weckel et al. ..................... | 426/250 X |
| 3,410,689 | 11/1968 | Nathan ................................ | 426/1 X |
| 3,421,899 | 1/1969 | Humphreys ............................. | 426/1 |
| 3,671,265 | 6/1972 | Maxwell et al. ................. | 426/251 X |

*Primary Examiner*—Robert A. Yoncoskie

*Attorney, Agent, or Firm*—Lyon & Lyon

[57] ABSTRACT

A new and improved fish bait and method for production thereof wherein grapes are treated with fish oil to create an artificial fish egg which has the same shape, flavor, consistency and other characteristics of natural fish eggs. According to the process, artificial fish eggs are manufactured by steeping grapes in an aqueous solution of fish oil and the resulting mixture is heated to a temperature in the approximate range of 87° – 94° C. When the grapes have acquired the necessary fish-like odor they rise to the surface of the soluton. The grapes can be of any variety, color and shape but small round grapes of the Thompson Seedless type are preferred and, if desired, can be dyed to virtually any color. Also, if the proper size grape is chosen, artificial eggs may be produced that simulate the natural eggs of a variety of fish. The aqueous solution may contain red artificial food coloring in varying proportions to impart the color of salmon eggs and a fluorescent dye, such as Rhodamine B may also be included in the aqueous solution to enhance the translucent appearance of the artificial eggs.

2 Claims, No Drawings

ARTIFICIAL FISH EGGS AND METHOD OF MAKING SAME

BACKGROUND OF THE INVENTION

Ever since man learned to fish, fishermen have attempted to increase their catch by discovering new and better means to attract fish. Although today's sport fisherman does not rely on fishing skills for his existence, as did early man, he still seeks a bait or lure that will "get them biting" and thereby increase his chances of becoming a successful angler. Often, a fisherman will have his own special, homespun concoction or time worn method to attract fish. However, in spite of the innumerable attempts that have been made, it is an inescapable conclusion that in order to achieve the best results, the fish bait chosen should be as near as possible in shape, flavor, consistency and color to the natural diet of the sought after fish. As a result, many attempts have been made to duplicate the various constituents of a fish's diet in order to successfully lure it to the hook.

The diet of many varieties of fish includes their own and other species fish eggs and as a result, many fishermen use natural fish eggs as bait. This, however, can be relatively expensive and eggs may be occasionally difficult to procure as the amount available fluctuates. Also, at a time when there is an increasing awareness toward conserving our natural resources, the use of live fish eggs leaves much to be desired. It is clear that the stocks of natural fish eggs should perhaps be better utilized in restocking the various streams and rivers rather than be used as bait. The use of natural eggs can, where there are insufficient reserves available to produce new fish stock, contribute to the depletion of our lakes and streams by removing the fish that will ultimately reproduce the new eggs. This cycle can have as its denouement the decimation of our natural resources.

The prior art exhibits numerous examples of attempts to develop an artificial fish egg that has the same consistency, shape, flavor and color as the natural commodity. For example, Mack et al, U.S. Pat. No. 1,045,716 teaches the treatment of tapioca kernels with sweetened water to yield a composition similar to fish spawn. A similar approach can also be found in Noxon, U.S. Pat. No. 1,291,614 which teaches the use of a trout bait comprised of a globule of hydrated tapioca colored to have the appearance of a salmon egg.

Other compositions of artificial fish eggs may include a homogenous gel comprising protein, water and both a toughening and hardening compound, where the protein consists of animal gelatin, animal glue and casein, Humphreys, U.S. Pat. No. 3,421,899. In addition, in Stephen et al, U.S. Pat. No. 3,876,803 the patentee manufactures artificial fish eggs by mixing a gel forming proteinaceous material such as animal glue, fish glue, fish gelation etc. and water at a temperature above the solgel transition temperature of the solution in the absence of a tanning agent. This mixture forms a homogeneous liquid proteinaceous mass which then undergoes further treatment to yield a fish bait with a cross linked exterior surface and a gelatinous body. While artificial fish eggs that approach the consistency and flavor of natural fish spawn are taught in the prior art, the methods involved are messy, time consuming and relatively complex.

BRIEF SUMMARY OF THE INVENTION

According to this invention, there is described an artificial fish egg and the method of manufacture. This egg comprises a grape that has been treated with fish oil to impart to it a fishlike odor. The grapes are added to an aqueous solution of fish oil and the mixture is heated at a temperature in the range of approximately 87°–94° C. When the grapes have acquired the proper flavor they will rise to the surface of the solution where they can be packaged and preserved in cans or jars for future use.

DETAILED DESCRIPTION OF THE INVENTION

The present invention described an artificial fish egg in the form of salmon eggs or roe which are notably similar to natural salmon eggs in shape, flavor, consistency and color and a method of preparing this artificial bait. The artificial eggs also have a skin of suitable strength so that they may be retained on the fish hook while subject to the stress and strains of normal fishing activity. Naturally, it is very important that the artificial egg have this property to prevent loss of the bait. An artificial egg should have a gelatinous consistency in order to duplicate a natural salmon egg. Also in order to more closely simulate the properties of natural fish eggs, it is also desirable to impart a fish-like odor to the artificial eggs.

It has unexpectedly been found that grapes treated in a fish oil, preferably cod liver oil, have a consistency, odor and shape that is similar to natural salmon eggs. While it is possible that untreated grapes may be a successful bait on some occasions, the use of grapes treated by the present methods more satisfactory results i.e. successful catches. While the mere soaking of the grapes in an aqueous solution of fish oil will impart a fish-like odor to the grapes, better results are obtained if the mixture of grapes and fish-oil solution are heated at a temperature approximately in the range of 87°–94° C. If the mixture is not heated to this temperature, harder artificial salmon eggs are produced. It is preferable to treat the harder spawn with ascorbic acid as a preservative. As each of the artificial eggs acquires the necessary odor during heating of the mixture it rises to the surface of the solution.

As natural salmon eggs have various shades of color that ranges from white to pink to red, the addition of red food coloring, usually artificial food coloring, to the aqueous solution will dye the artificial eggs to the chosen shade. If one desires a different color egg such as green or blue to imitate natural fish eggs other than salmon, a different artificial food coloring may be used. Artificial eggs that are also successful may be manufactured by merely treating the grapes with food coloring in the absence of fish oil. In order to enhance the roe's generally translucent appearance a fluorescent dye may be used. While many dyes are satisfactory the preferred dye is one known as Rhodamine B. Examples of various dyes and the method of applying them may be found in Sarich, U.S. Pat. No. 2,932,572, the disclosure of which is incorporated here by reference.

In a preferred embodiment of the invention thirty pounds of the grapes are added to an aqueous solution containing five gallons of water, one ounce of food coloring, one gram of Rhodamine B and one pint of cod liver oil.

The fish eggs need not have only a fish-like odor, as a cheese flavoring has also been found to be successful. In order to impart a cheese flavor to the grapes, cheese, finely chopped, is added to the aqueous solution along with the fish oil. Artificial cheese flavoring may also be used.

It is also preferred that the grapes chosen for treatment be picked at the highest peak of sugar content because grapes harvested at this stage of their development have an inner texture that most nearly approximates the consistency of real salmon eggs. After the grapes are harvested they are stored with their stems for a short period of time at a temperature of approximately 45° F. until they are ready to be processed. Although it is preferred to use Thompson Seedless grapes which have been grown in this manner, virtually any grape, treated according to this invention, will give satisfactory results.

While my invention has been described by reference to preferred embodiments thereof, it will be understood that the invention is not limited thereto, but only to the lawful scope of the appended claims.

I claim:

1. A method of manufacturing a fish bait having physical characteristics of natural fish egg bait which comprises steeping grapes in a steeping composition of fish oil and water to impart to the grapes a fish-like odor, said steeping composition being agitated to effect mixing of the fish oil and water, the steeping composition being heated at a temperature in the approximate range of 87°–94° C. until the treated grapes rise to the surface of said steeping composition.

2. The method according to claim 1 wherein the steeping composition contains food coloring.

* * * * *